June 27, 1967 M. LEBOVITZ 3,327,622

APPARATUS FOR SHAPING MEATS

Filed Aug. 24, 1965 3 Sheets-Sheet 1

INVENTOR.
MORRIS LEBOVITZ
BY
*William J. Ruano*
ATTORNEY

INVENTOR.
MORRIS LEBOVITZ
BY
William J. Ruano
ATTORNEY

United States Patent Office 3,327,622
Patented June 27, 1967

3,327,622
APPARATUS FOR SHAPING MEATS
Morris Lebovitz, Pittsburgh, Pa., assignor, by mesne assignments, of twenty-five percent to Stanley Franzos, thirty-seven and one-half percent to Jack Lebovitz, and thirty-seven and one-half percent to Morris Lebovitz, all doing business as Lebo Press Company, Pittsburgh, Pa.
Filed Aug. 24, 1965, Ser. No. 482,176
1 Claim. (Cl. 100—232)

This invention relates to apparatus for shaping meats, particularly semi-frozen, fresh meat in solid form, for the purpose of providing uniform cross-section and density thereto so that upon slicing, the pieces will be of the same size, for example, uniformly sized discs. Such pieces are especially useful for making steak sandwiches.

A common method of shaping an irregular piece of semi-frozen fresh meat, such as a solid piece of beef, is to first thaw it out from its initial semi-frozen condition in which it is shipped to enable deformation into the desired shape. The piece is then trimmed down to the right length and cross-section so that it may be fitted into a two-part mold having the desired shape. The mold cover is now tightly clamped to deform the meat to the shape of the mold and the mold is stored in a freezer until the meat is frozen. The mold must then be thawed out to enable separation of the adhering frozen meat therefrom which will thaw out the outer surface portion of the meat. The piece is then sliced and refrozen. This method has many outstanding objections. In the first place, as the result of initial thawing to enable deformation of the meat, a substantial amount of blood will run out and become lost, which constitutes a great waste and causes the meat to become dry, fibrous and lose most of its taste. In the trimming process whereby the piece must be reduced in length and cross-section to approximately the shape of the mold so as to fit therein, there results a great amount of waste since the pieces trimmed off are unusable except for grinding. Moreover, a large number of individual molds must be used in order to shape an appreciable number of pieces of meat. Additionally, great manual effort is required to clamp the mold covers sufficiently tightly so as to compress the meat into the shape of the mold, therefore making the clamping operation of the molds a very laborious and time consuming undertaking. The thawing operation and removal of the pieces from the mold likewise are time consuming, moreover, the above-described alternate thawing and freezing operations expose the meat to bacteria and cause the meat to discolor and look spoiled, thereby requiring further trimming and resulting in more waste. Thus, in view of the large number of operations required, the excessive waste, and the loss of flavor of the resulting product, this method is far from satisfactory.

An object of the present invention is to overcome the above-named disadvantages of the described common method of shaping meat and to provide a novel apparatus for shaping fresh pieces of solid meat into a uniform configuration, such as a cylindrical configuration, so that slices thereof are of uniform size and density.

A more specific object of the present invention is to provide a novel apparatus for shaping meat into cylindrical form or other desired shape, which apparatus eliminates loss of blood as well as flavor and discoloration normally accompanying commonly used meat shaping operations, also which is speedier than presently known methods, and which provides a uniformly shaped solid piece of meat retaining all the blood content and flavor as well as the original appearance of fresh meat.

A further object of the present invention is to provide a novel hydraulic press wherein the entire operating mechanism is under the table and having a novel die construction and meat retaining and compressing means to provide uniform shaping of substantially frozen meat.

Other objects and advantages of the present invention will become apparent from a study of the following specification, taken with the accompanying drawings wherein.

Figure 1:
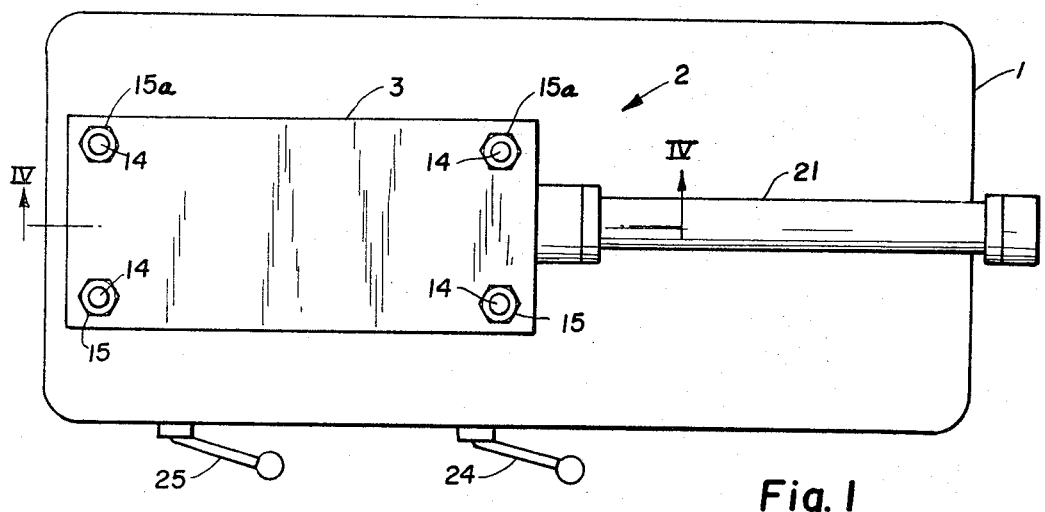
FIG. 1 is a top view of a hydraulic press embodying the principles of the present invention.
Figure 2:
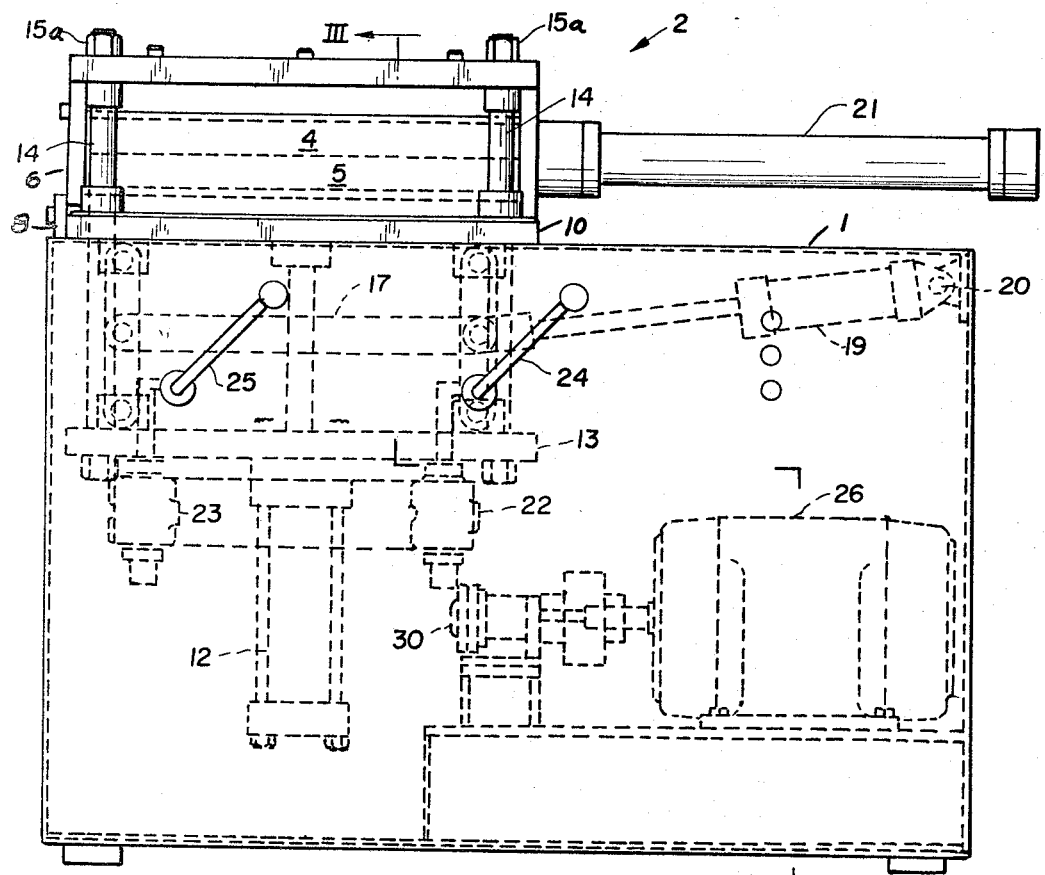
FIG. 2 is a front, elevational view of said press with enclosed parts shown in dash lines.

Referring more particularly to FIG. 1, numeral 1 denotes a stationary table forming the top of an enclosed cabinet and having rigidly supported thereon a bottom die shoe 10, which in turn supports a bottom die 5 of substantially semicylindrical shape and having an end wall 9. Cooperating therewith and vertically movable relative thereto is a top die 4, also of semicylindrical shape, so that together with die 5 there will be formed a hollow cylindrical mold. A top die shoe 3 supports die 4 and is rigidly connected to rods 14, member 13 and cylinder 12 so that shoe 4 is moved upwardly and downwardly in unison with cylinder 12 when fluid is introduced at the top or bottom end, respectively, of hydraulic cylinder 12 on opposite sides of a piston 12a contained therein. Rods 14 are fastened by bolts 15a.

The source of hydraulic fluid, such as oil, comprises a storage tank 27 filled with oil and enclosing an inlet 28 to a hydraulic pump 30 which is driven by a suitable motor 26. The hydraulic pump 30 creates pressure in a pressure line 29 which is connected, through relief valve 31, to two two-way or reversing valves 22 and 23. A pressure relief valve 41 is provided to avoid building up of excessive or unsafe pressures. A return line 42 is provided for returning hydraulic fluid to the tank 27. The reversing valve 23 is operated by a handle 25. Oil or hydraulic fluid may be introduced, when desired, in either end of valve 23 and may be selectively introduced either into the right or left end of hydraulic cylinder 21 through pipes 35 or 34, respectively. In other words, by introducing hydraulic fluid either into the right end or left end of the piston in cylinder 21, the piston rod 38 may be selectively moved longitudinally or horizontally in either direction so as to reciprocate the ram or plunger 39.

As plunger 39 moves to the left against the semi-frozen piece of meat M, when dies 4, 5 are in the closed position, the meat will become compressed into cylindrical shape. The meat is forced against an end door 6 which is rigidly fastened to the upper die 4 so that when the door 6 is lowered from the lifted or open position shown in FIG. 4 to the closed position shown in FIG. 5, the door will be backed up by a stop element 8, rigidly fastened to the end of the bottom die holder 10. Thus, there will be no tendency for door 6 to be forced open as the result of compression of the meat, in view of the back-up provided by stop element 8.

Figures 3, 4:
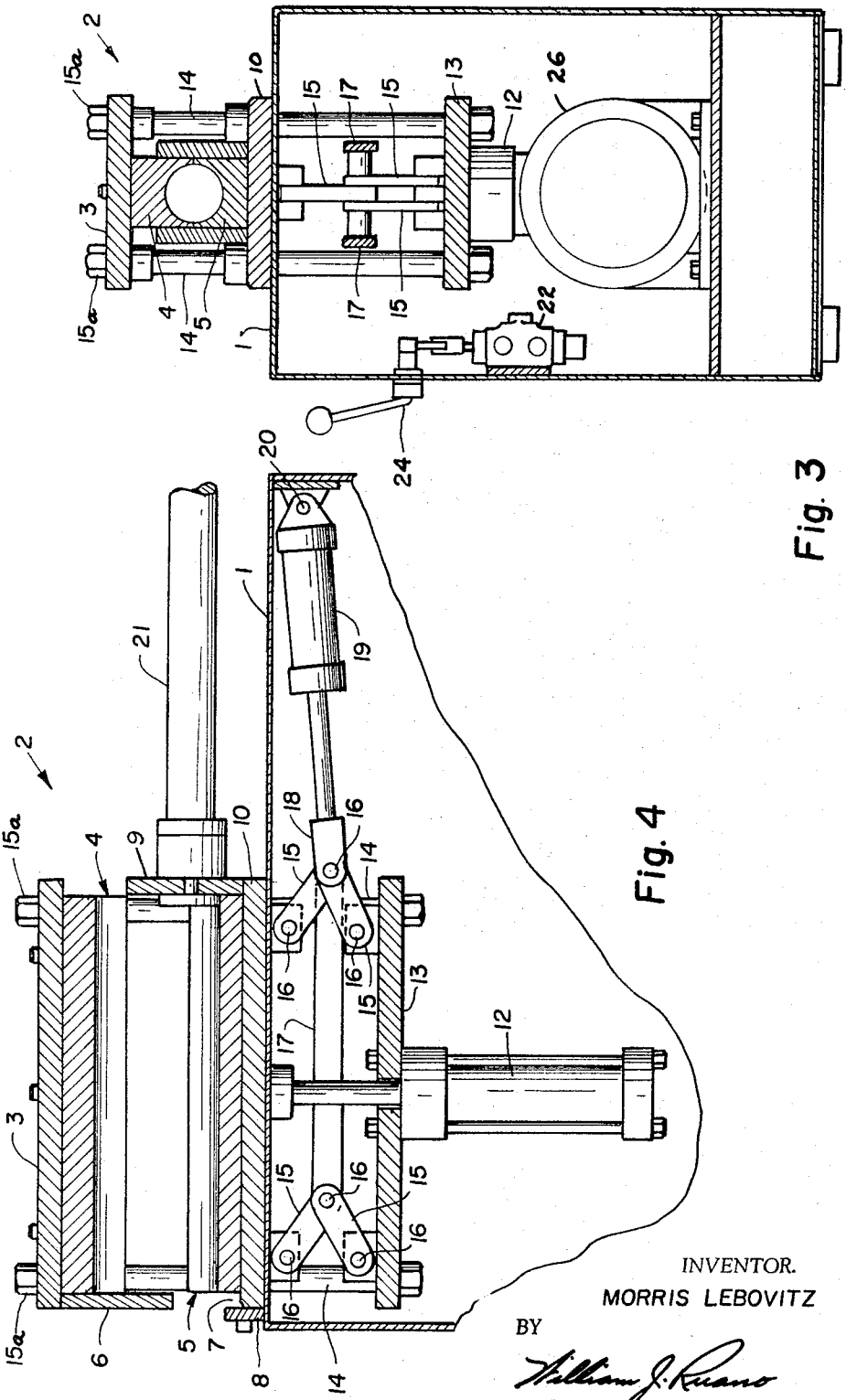
FIG. 3 is a cross-sectional view taken along line III—III of FIG. 2.
FIG. 4 is a cross-sectional view taken along line IV—IV of FIG. 1.

In order to lower the die holder 3 and upper die 4, a hydraulic cylinder 12 is provided containing a piston so that hydraulic fluid may be introduced through pipe 37 to the upper side, or through pipe 36 to the lower side, depending upon the position of operating handle 24 which operates a reversing valve 22. As the handle 24 is moved to the lowering position, and assuming that the press is in the open position as shown in FIG. 4, fluid under pressure is introduced through pipe 36 to the lower end of cylinder 12, thereby lowering the cylinder together with element 13 rigidly connected thereto as well as rods 14, top die holder 3 and top die 4. Fluid is also introduced into the right side of cylinder 19 to effect movement of the piston rod to the left. The assembly is moved from the position shown in FIG. 4 to that shown in FIG. 5. As member 13 is lowered relative to the stationary table 1, it will carry with it the lower pivots 16 of toggles 15, 16 which toggles are joined together by link 17 connected to a piston rod which reciprocates in cylinder 19, the latter being pivotally connected at 20 to the table. Therefore, as the toggle assembly straightens out vertically to the position shown in FIG. 5, it will form a rigid mechanical back up or support to assure locking of the dies together in the closed position.

Figure 5:
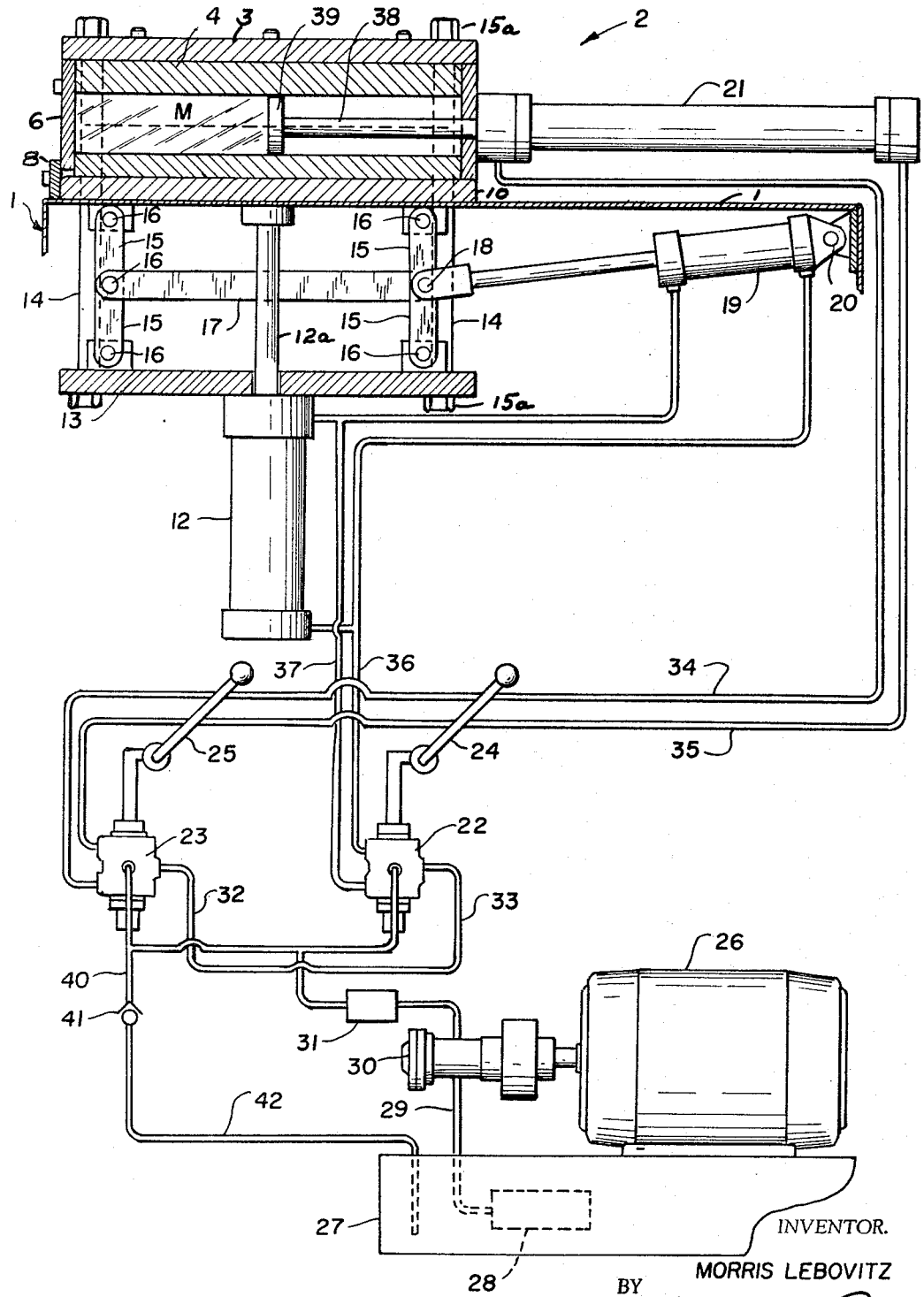
FIG. 5 is a schematic view showing the entire hydraulic system of said press.

As handle 24 is moved to the opening or lifting position, hydraulic fluid under pressure is introduced into the top end of cylinder 12, as well as into the left end of cylinder 19, thereby causing movement of the parts from the position shown in FIG. 5 to that shown in FIG. 4 to effect opening of the dies.

An important feature of the invention resides in the complete enclosure of the die operating mechanism within the cabinet for greater safety as well as to eliminate the necessity of moving parts above the level of die holder 3.

Another important feature of the invention is the rigid connection between the end element or door 6 and top die holder 3 so that they both move downwardly in unison to completely close the die cavity, whereupon by effecting horizontal reciprocation of the piston in cylinder 21 by reciprocation of handle 25, the semi-frozen meat M is compressed or compacted into cylindrical shape with no voids and with substantially uniform density.

In operation, the hydraulic press embodying the present invention is adapted to reshape frozen meat at temperatures from zero to 30° F. The usual method is to freeze the product at zero or 10 degrees below and then place in a tempering cooler and reduce to the desired temperature for slicing. The tempered product is then placed in the press and formed, then moved to the slicer. While slicing temperatures are usually between 22 and 28° F. the produce may be formed at lower temperatures and stored in the freezer. Then the product may be tempered at a later date to the desired slicing temperature.

The press is equipped with a pressure gauge (not shown) which will permit proper pressure control for each type of product ranging from 100 pounds to 1500 pounds. Only sufficient pressure is used to form a perfect roll. Too much pressure will destroy the original texture of the meat. And since the pressure can be controlled, for a given temperature, the meat will always be compressed uniformly to the same density, therefore, the weight of each slice of a given thickness will always be the same. This, eliminates the necessity of weighing each slice and the use of a scale in the production line.

Since the top die of the press is locked into position by straightening of the toggle arms, the diameter of the reshaped meat will always be the same and only the length of the meat roll will be varied, depending on the total volume. Air pockets and the like are completely eliminated, giving a very uniform and substantially constant density throughout the entire cross-section.

The above press can be used to form other than cylindrical shapes, such as square, oval, or chop-shapes, merely by interchanging the dies to those having these shapes, which change can be made in a few minutes.

An outstanding feature of the invention is that all of the hydraulic control mechanism is situated underneath the dies and is totally enclosed in a cabinet, whereby easy and safe access is provided to the open dies when feeding meat therein.

Another important feature is the shape of the upper die which includes an end door or wall 6 which is rigidly connected to the upper die, whereby upon lowering of the upper die, there will be complete enclosure of the semi-frozen meat, so that upon ramming by the piston 39, the length of the meat is reduced until the volume is completely taken up by the reshaped meat, to form a perfect cylinder or other shape.

The present press will reshape meat in the matter of a few seconds and is adapted to form or reshape solid meat, hamburger, chipped or chopped meat so as to reduce storage and freezer space, as well as clean up costs, and increase production by as much as 800%, cutting waste to a minimum and producing exact weight cuts for meat canners, fish canners or poultry canners. It eliminates the necessity of expensive molds, hot water dip tanks, washing and sterilizing molds, large freezer space for molds, and avoids discoloration and ring formation as well as freezer burning on steaks and the like, and eliminates the necessity of rehandling the product.

Thus it will be seen that I have provided an efficient apparatus for reshaping semi-frozen meat into any desired shape so that air pockets are eliminated and substantially constant density is provided, thereby producing slices of equal weights; furthermore, I have provided a novel hydraulic press having a novel upper die construction including an attached end wall, whereby upon lowering, complete enclosure of meat is obtained so that ramming may be effected longitudinally to form a uniformly dense, solid cylinder or rectangular block of meat; furthermore, I have provided a novel hydraulic press wherein all operating parts are located beneath the dies and are totally enclosed so as to provide easier and safer access to the dies, and whereby a toggle mechanism is provided for securely mechanically locking the upper and lower die halves together while longitudinal ramming takes place.

While I have illustrated and described a single specific embodiment of my invention, it will be understood that this is by way of illustration only, and that various changes and modifications may be made within the contemplation of my invention and within the scope of the following claim.

I claim:

In a hydraulic press for shaping meat into elongated form, in combination, a bottom elongated stationary die half, comprising unitary bottom and sidewalls, a closed end wall at one end, said die half being open at the other end, a top movable die half of complementary shape comprising unitary bottom and sidewalls, an end wall rigidly fastened at one end, the other end being open, guide means for vertically guiding said top die half so that it may be raised from, or lowered into engagement with said bottom die half and when so lowered, said closed end wall of said upper die half closing said open end of the bottom die half, back-up means stationarily mounted in spaced horizontal relationship with respect to said open end of said bottom die half by a distance equal substantially to the thickness of said closed end wall of said upper die half so as to provide back-up reinforcement when the die halves are in the closed position, a table on which said bottom die half is supported, a vertically movable element spaced below and parallel to said table, a vertically disposed hydraulic cylinder located underneath said element for vertically reciprocating said top die half along said guide means, said cylinder comprising a piston rigidly secured underneath said table, and wherein said cylinder is rigidly secured to said vertically movable element, and toggle means secured between said table and said vertically movable element and arranged so as to straighten slightly beyond dead center when said die halves are in the closed position so as to provide mechanical locking together of said die halves, and hydraulic cylinder means for actuating said toggle means in unison with vertical movements of said top die half; a plunger reciprocable longitudinally within said die halves and conforming to the cross-section thereof, a horizontally disposed hydraulic cylinder exteriorly of said die halves and including a piston in coaxial relationship to said plunger and control means for selectively introducing hydraulic fluid alternately against opposite faces of said piston in said horizontally disposed hydraulic cylinder so as to effect horizontal reciprocation of said plunger contained within said die halves and ramming of a piece of meat contained therein when the die halves are in the closed position, thereby shortening the length of the meat and deforming it into an elongated shape corresponding in cross-section to that of said die halves.

References Cited

UNITED STATES PATENTS

| | | | |
|---|---|---|---|
| 43,516 | 7/1864 | Marshall. | |
| 232,339 | 9/1880 | Cutting. | |
| 234,983 | 11/1880 | Hoefjen | 100—218 |
| 566,976 | 9/1896 | Forder. | |
| 1,888,446 | 11/1932 | Bellinghausen et al. | |
| 2,334,774 | 11/1934 | Jordan. | |
| 2,565,245 | 8/1951 | Lebovitz | 100—38 |
| 2,932,246 | 4/1960 | Galas | 100—232 |
| 3,019,722 | 2/1962 | Gum | 100—1 |
| 3,040,654 | 6/1962 | Opie | 100—53 |

BILLY J. WILHITE, *Primary Examiner.*